No. 665,902. Patented Jan. 15, 1901.
H. E. HEATH.
DYNAMO ELECTRIC MACHINE.
(Application filed June 7, 1900.)
(No Model.)
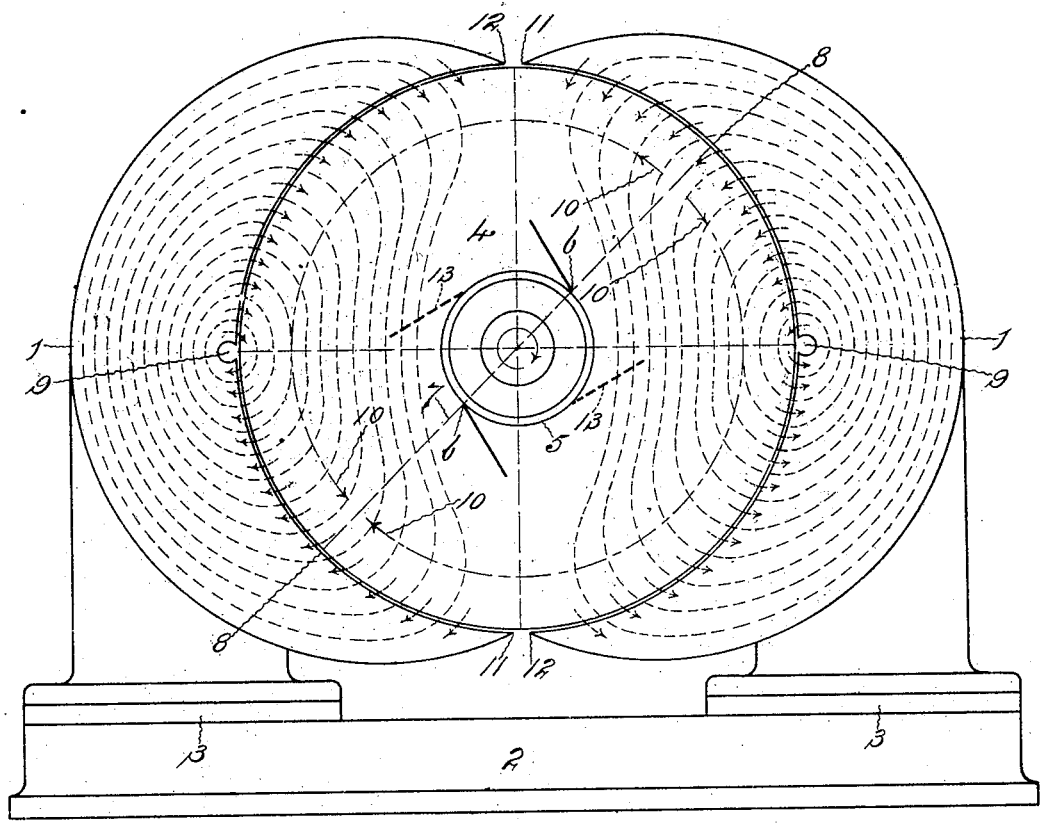

UNITED STATES PATENT OFFICE.

HARRY E. HEATH, OF WINDSOR, CONNECTICUT, ASSIGNOR TO THE EDDY ELECTRIC MANUFACTURING COMPANY, OF SAME PLACE.

DYNAMO-ELECTRIC MACHINE.

SPECIFICATION forming part of Letters Patent No. 665,902, dated January 15, 1901.

Application filed June 7, 1900. Serial No. 19,386. (No model.)

*To all whom it may concern:*

Be it known that I, HARRY E. HEATH, a citizen of the United States, residing at Windsor, in the county of Hartford and State of Connecticut, have invented certain new and useful Improvements in Dynamo-Electric Machines, of which the following is a specification.

This invention relates to a dynamo-electric machine the magnetic field of which is excited by the current in the armature-conductors only.

The object of the invention is to provide a simple and easily-constructed dynamo-electric machine which will operate efficiently as a direct or alternating current motor or continuous-current generator without the employment of other windings for exciting the magnetic field than those upon the armature.

The dynamo-electric machine that embodies this invention has an armature of common type wound for the desired number of pairs of poles with the brushes—that is, the planes of commutation—so arranged with relation to the unwound magnetically-separated pole-pieces that the magnetic flux excited by the currents in the armature-windings takes such a path through the armature and the pole-pieces that about each plane of commutation portions of the magnetic flux in one direction between the armature and the pole-pieces will act and react equally upon the armature-currents, thus neutralizing each other about the planes of commutation and allow the magnetic flux in the opposite direction between the pole-pieces and the armature to create the polar effects required to cause an efficient operation of the machine.

The accompanying view is a diagrammatic illustration of a two-pole dynamo-electric machine, which may be used either as a generator or motor, that embodies this invention.

The machine may have any number of pairs of pole-pieces 1, that represented for the purpose of illustrating this invention having a single pair. These pole-pieces can be formed either of solid or laminated cast or wrought iron or steel. Their shape is immaterial, although it is preferred that they be designed, substantially as shown, to lie close to and cover as much of the periphery of the armature as possible and permit an uninterrupted flow of magnetic lines of force without redundance of metal. The pole-pieces, which have no winding whatever, are magnetically separated from each other by air-gaps and are magnetically separated from the bed 2 by suitable non-magnetic plates 3, interposed between the pole-pieces and the bed, so that there will be no magnetic flux from one to the other, except through the armature.

The armature 4 may be any common type, either ring, drum, pole, or disk, having the required number of coils of the necessary number of turns of suitable wire laid upon its core and connected with the commutator 5 in any approved manner for obtaining the best results without sparking at the brushes.

The brushes 6 may be any common form, and their number will of course depend upon the method of connecting the armature-windings with the commutator. Two brushes are indicated on the drawing illustrating the present invention.

The brushes of this machine are so located that the planes of commutation—that is, the magnetic poles of the armature—will, as indicated by the line 7, intersect the inner surfaces of the pole-pieces at approximately one-quarter of their length, as at 8. This when the machine is operated will create magnetic currents through the armature and pole-pieces the centers of which will be on planes approximating the middle of the length of the inner surfaces of the pole-pieces, as at 9. A small portion of the inner face of each pole-piece can be removed at this place for assisting the neutral points of the magnetic circuits to locate approximately half the distance from the ends of the pole-pieces. In other words, the armature magnetic poles are created in such planes as to produce magnetic currents that utilize one half of the surface of each pole-piece for flow in one direction between the armature and pole-piece and utilize the other half of the surface of each pole-piece for flow in the opposite direction between the armature and pole-piece. With the pole-pieces thus arranged and the planes of commutation so fixed with relation to the pole-pieces the armature-currents which flow in opposite directions on opposite sides of the planes of commutation, as indicated by the arrows 10, are effected by substantially equal numbers of magnetic lines of force, and thus the currents about these planes of commutation act and react equally and neutralize each other, so that one half of each pole-piece, as from 9 to 11, exerts no effective polar action upon the armature. This, however, leaves the other half of each pole-piece, as from 9 to 12, to exert its magnetic polar effect without hindrance and cause an efficient action of the armature.

The action of the machine may be reversed by providing a duplicate set of brushes and locating them, as at 13, approximately halfway between the brushes 6 and switching the current from one set of brushes to the other or by so supporting the brushes 6 that they may be moved from opposite approximately one-quarter of the distance along the pole-pieces to opposite approximately three-quarters of the distance along the pole-pieces—the positions indicated by 13.

This machine is compact, is light in weight, and easily constructed. The strength of the field depends upon the currents in the armature, and the efficiency is high for the neutralization of the reactive portions of the field by balancing different portions of the magnetic flux in one direction, leaving a free polar field of maximum strength for causing the machine to operate.

This design is particularly desirable for fan-motors, although it is of course applicable for vehicle-motors and continuous-current generators.

I claim as my invention—

1. A dynamo-electric machine having unwound pole-pieces, and a wound armature with the planes of commutation of the armature-circuits arranged to intersect the pole-pieces in a manner that will create magnetic flux through the armature and each pole-piece of such shape that approximately one half of the effect of the magnetic flux in one direction between the armature and the pole-piece will neutralize the effect of the other half of the magnetic flux in the same direction between the armature and the same pole-piece, leaving the full flux in the opposite direction between the armature and that pole-piece to exert operative polar effect, substantially as specified.

2. A dynamo-electric machine having unwound magnetically-separated poles and a wound armature with the planes of commutation of the armature-circuits arranged to intersect the pole-pieces in a manner that will create magnetic flux through the armature and each pole-piece of such shape that approximately one half of the effect of the magnetic flux in one direction between the armature and the pole-piece will neutralize the effect of the other half of the flux in the same direction between the armature and the same pole-piece, leaving the full flux in the opposite direction between the armature and that pole-piece to exert operative polar effect, substantially as specified.

3. A dynamo-electric machine having unwound pole-pieces and a wound armature with the planes of commutation of the armature-circuits arranged to intersect the pole-pieces at approximately one-fourth of their length and create magnetic flux through the armature and pole-pieces which have their neutral points at approximately one-half of the length of the pole-pieces, whereby the magnetic flux in one direction between the armature and each pole-piece will be neutralized and the magnetic flux in the opposite direction between the armature and each pole-piece will be effective, substantially as specified.

4. A dynamo-electric machine having unwound pole-pieces and a wound armature with the planes of commutation of the armature-circuits so arranged that the armature-currents create magnetic flux through the armature and each pole-piece, the center of which magnetic flux is approximately midway of the length of the pole-piece, substantially as specified.

5. A dynamo-electric machine having unwound pole-pieces and a wound armature with the planes of commutation of the armature-circuits arranged to intersect the pole-pieces at approximately one-fourth of their length, whereby equal portions of the armature-currents in opposite directions are neutralized by the magnetic flux that is created by the currents in the armature-windings in one direction between the armature and each pole-piece, substantially as specified.

HARRY E. HEATH.

Witnesses:
VIRGINIA R. HOLCOMB,
HARRY R. WILLIAMS.